US011762494B2

(12) United States Patent
Dumont et al.

(10) Patent No.: US 11,762,494 B2
(45) Date of Patent: Sep. 19, 2023

(54) SYSTEMS AND METHODS FOR IDENTIFYING USERS OF DEVICES AND CUSTOMIZING DEVICES TO USERS

(71) Applicant: Amazon Technologies, Inc., Seattle, WA (US)

(72) Inventors: Michael David Dumont, Sunnyvale, CA (US); Jonathan White Keljo, Seattle, WA (US); Levon Dolbakian, Los Gatos, CA (US); Srinivasan Sridharan, Sunnyvale, CA (US); Arnaud Marie Froment, San Jose, CA (US); Nadim Awad, San Francisco, CA (US); Kenneth Paul Kiraly, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/074,946

(22) Filed: Oct. 20, 2020

(65) Prior Publication Data

US 2021/0034192 A1 Feb. 4, 2021

Related U.S. Application Data

(63) Continuation of application No. 16/240,150, filed on Jan. 4, 2019, now abandoned, which is a continuation
(Continued)

(51) Int. Cl.
*G06F 3/041* (2006.01)
*G10L 17/10* (2013.01)
(Continued)

(52) U.S. Cl.
CPC .......... *G06F 3/0416* (2013.01); *G06F 3/0414* (2013.01); *G06F 21/32* (2013.01); *G06V 40/176* (2022.01); *G10L 17/06* (2013.01); *G10L 17/10* (2013.01); *G10L 17/22* (2013.01); *G10L 21/055* (2013.01); *G10L 25/48* (2013.01)

(58) Field of Classification Search
CPC ...... G06F 21/32; G06F 3/0416; G06F 3/0414; G10L 17/06; G10L 17/10; G10L 17/22; G10L 21/055; G10L 25/48; G06V 40/176
See application file for complete search history.

(56) References Cited

U.S. PATENT DOCUMENTS 6,219,640 B1 * 4/2001 Basu ................. G06V 40/16
704/231
2004/0162726 A1 * 8/2004 Chang ............... G10L 17/26
704/E17.015
(Continued)

*Primary Examiner* — Michael N Opsasnick
(74) *Attorney, Agent, or Firm* — PIERCE ATWOOD LLP

(57) ABSTRACT

A system and method for identifying a user of a device includes comparing audio received by a device with acoustic fingerprint information to identify a user of the device. Image data, video data and other data may also be used in the identification of the user. Once the user is identified, operation of the device may be customized based on the user. Further, once the user is identified, data can be associated with the user, for example, usage data, location data, gender data, age data, dominant hand data of the user, and other data. This data can then be used to further customize the operation of the device to the specific user.

20 Claims, 13 Drawing Sheets

Related U.S. Application Data of application No. 15/082,104, filed on Mar. 28, 2016, now abandoned, which is a continuation of application No. 13/838,572, filed on Mar. 15, 2013, now Pat. No. 9,299,350.

(51) Int. Cl.
*G10L 25/48* (2013.01)
*G06F 21/32* (2013.01)
*G06V 40/16* (2022.01)
*G10L 17/06* (2013.01)
*G10L 17/22* (2013.01)
*G10L 21/055* (2013.01)

(56) References Cited

U.S. PATENT DOCUMENTS

| | | | |
|---|---|---|---|
| 2005/0077997 A1* | 4/2005 | Landram | H04L 67/34 340/5.54 |
| 2008/0240379 A1* | 10/2008 | Maislos | H04M 3/4938 379/88.13 |
| 2008/0252412 A1* | 10/2008 | Larsson | B60R 25/252 340/5.2 |
| 2009/0298514 A1* | 12/2009 | Ullah | H04W 4/02 340/572.1 |
| 2010/0114573 A1* | 5/2010 | Huang | G10L 17/24 704/250 |
| 2011/0161172 A1* | 6/2011 | Lee | H04L 67/025 709/224 |
| 2012/0117094 A1* | 5/2012 | Pratt | G06Q 10/06 707/758 |
| 2012/0295708 A1* | 11/2012 | Hernandez-Abrego | G06F 3/167 463/36 |
| 2013/0295913 A1* | 11/2013 | Matthews, III | H04M 1/72463 455/420 |
| 2014/0075351 A1* | 3/2014 | Hansen | G06F 9/4451 715/765 |
| 2015/0019220 A1* | 1/2015 | Talhami | G10L 17/04 704/244 |

* cited by examiner

SYSTEMS AND METHODS FOR IDENTIFYING USERS OF DEVICES AND CUSTOMIZING DEVICES TO USERS

CROSS-REFERENCE TO RELATED APPLICATION

This application is a continuation of, and claims the benefit of priority of, U.S. Non-provisional patent application Ser. No. 16/240,150, filed Jan. 4, 2019, and entitled "Systems and Methods for Identifying Users of Devices and Customizing Devices to Users", which is a continuation of, and claims the benefit of priority of, U.S. Non-provisional patent application Ser. No. 15/082,104, filed on Mar. 28, 2016, and entitled "Systems and Methods for Identifying Users of Identifying Users of Devices and Customizing Devices to Users," which is a continuation of, and claims benefit of priority of, U.S. Non-provisional patent application Ser. No. 13/838,572, filed Mar. 15, 2013 and entitled "Systems and Methods for Identifying Users of Devices and Customizing Devices to Users," which has since issued as U.S. Pat. No. 9,299,350, the contents of which is expressly incorporated herein by reference in its entirety.

BACKGROUND

With the advancement of technology, the use and popularity of electronic devices, such as smart phones, has increased considerably. Human-computer interactions have even progressed to the point where humans can control these devices, and provide input to these devices, by speaking. Devices are designed to be marketed to the general public and typically include generic user interfaces and operating instructions that appeal to the general masses of users.

BRIEF DESCRIPTION OF DRAWINGS

For a more complete understanding of the present disclosure, reference is now made to the following description taken in conjunction with the accompanying drawings.

DETAILED DESCRIPTION

Typically, computing devices are designed to be marketed to the general public. Thus, devices are configured for use by a general computing public with little device customization. While individual devices may be customized by their users after purchase, such customization may involve significant manual input by a user and the resulting customization is generally limited to the specifically configured device. Aspects of the present disclosure are directed to methods and systems to detect and identify a user of a device. Once the user is identified, operation of the device may then be configured according to the specific user's profile, thereby allowing customization of device to the user. The configuration may be performed on local devices through cooperation of a remote device, which may provide the ability to configure a device for a variety of users, even users who may have previously not used the device before. A number of techniques, including audio recognition of the user, may be employed. Other techniques may also be used to verify and/or supplement the audio recognition. The techniques described herein may be applied to a variety of computing devices, such as telephone computing devices, laptop computers, cellular phones, personal digital assistants (PDAs), tablet computers, other mobile devices, server-client computing devices, mainframe computing devices, etc.

In one aspect of the present disclosure, a user of a device is identified using voice fingerprinting techniques, and usage data corresponding to the user is collected and analyzed to customize the behavior and operation of the device to the specific user. For example, the user interface of the device may be modified to suit the specific user. In another example, customized data, for example, targeted advertisements, and other data may be set to the device. In another example, specific user data such as contacts, calendar information, or other user specific information may be accessed by the device when operated by the specific user. The user specific information may be stored on a local device or on a remote device. If stored on a remote device, the user specific information may be accessed by the remote device, may be downloaded by the local device when being operated by the specific user, or some combination thereof. In another aspect, the device may adjust its input and/or output processes based on the identity of a user. For example, if the user's profile indicates that she is left-handed and typically uses light strokes to interact with a touch screen of the device, once the user is identified, the device may adjust the sensitivity of its touch screen to account for the user's touch characteristics. In another example, a device may adjust a screen output font size based on a user's history or preference of item viewing size as indicated in the user's profile.

Figure 1:
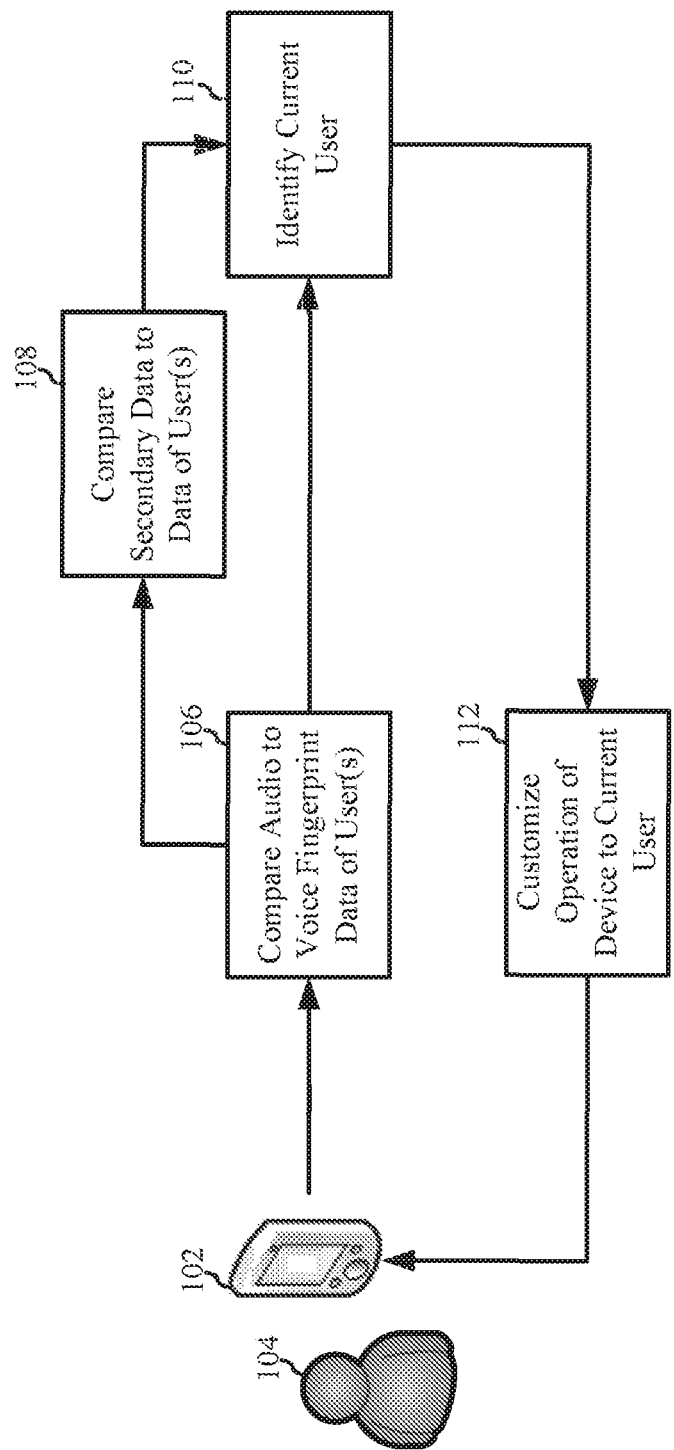
FIG. 1 illustrates a pictorial diagram of a method and system for identifying a user of a device according to one aspect of the present disclosure.

FIG. 1 illustrates an exemplary implementation of the system and method. A device 102, for example, a mobile device, may include one or more input devices, such as a microphone, an inertial sensor, a video recorder, a camera, and other input devices that may be used to identify the user of the device. In one aspect, the device 102 may receive a spoken audio input from a user 104 via a microphone of the device 102. The audio input may be compared to a profile of one or more users based on previous audio inputs of the user(s). Each user's profile may include a characterization of the user's speaking input that may be used to identify the user among other users. This characterization may be referred to as a voice signature, a voice fingerprint, or an acoustic fingerprint. Audio input into the device may be compared to voice fingerprint data of users, as shown in block 106, to identify the current user of the device, as shown in block 110. In some aspects, the device 102 may also receive secondary data (for example, image data, video data and/or usage/touch characteristics, etc.) of the user 104 through a camera, a video recorder and/or inertial sensors of the device. The device 102 may then compare the secondary data to available image, video and/or usage/touch characteristic data of user(s), as shown in block 108, as a supplement to the audio data to identify the current user, as shown in block 110. For example, the device 102 may compare the image data with a stored image of the user 104 to determine that the user 104 is the one speaking; the device 102 may analyze the video data and compare lip and mouth movements of the user to determine that the audio data received by a device's microphone is actually coming from the device's user 104 rather than someone also near the microphone; and/or the device 102 may compare the usage/touch characteristics with a stored user usage/touch profile of the user 104 to determine that the user 104 is the using the device 102. Other information, such as data from an inertial device, locator device, touchscreen, etc. may also be used to confirm the identity of the user.

Once the user is identified, the operation of the device may be customized to the user, as shown in block 112. In addition, once a current user has been identified, the operation of the device user may be associated with the user and analyzed so that future customization of that device (or other devices) may take into account the user's operation of the device, thereby enabling the device to be more particularly customized to suit the needs and tendencies of the user.

The operations of FIG. 1 may be performed locally on a device being operated by a user, or may be performed in whole or in part on a remote device which is connected to the device being operated by a user. For example, a remote device may store the acoustic fingerprint data used to identify users. A more detailed description of a distributed environment using a local device and one or more remote devices is discussed below.

Aspects of the present disclosure may allow for customization of the operation of devices to suit the particular needs of the specific users. This may improve the efficiency of the devices as well as the efficiency of the users themselves. In one example, the acoustic fingerprint of the user may be stored in a user profile for the user, and used to identify the user of the device based on the user's voice. Upon identifying the current user of the device, the user interface of the device may be customized for operation based on a number of user specific characteristics described below. The operation of the device may also be customized in numerous other ways as also described in further detail below.

Figure 2:
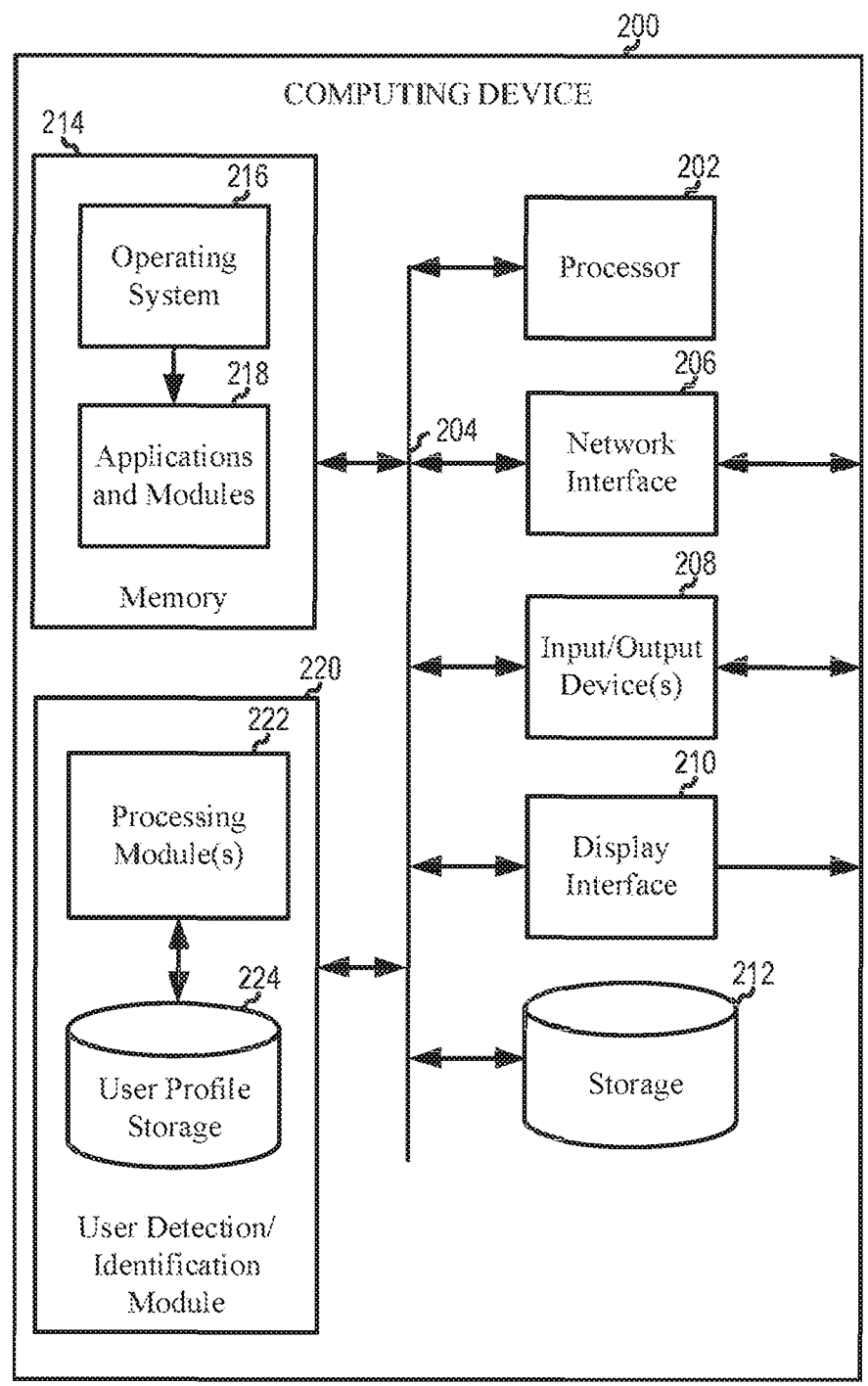
FIG. 2 is a block diagram conceptually illustrating a computing device according to one aspect of the present disclosure.

Aspects of the present disclosure may be implemented as a computer implemented method in a computing device or computer system. FIG. 2 illustrates an exemplary computing device 200. The computing device 200 may include a processor 202 in communication with a variety of other components over a system bus 204 or through a direct connection. The other components may include, for example, a network interface 206, one or more input and/or output devices 208, a display interface 210, and a storage database 212. As appreciated by those skilled in the art, the network interface 206 enables the computing device 200 to communicate data, control signals, data requests, and other information with other resources including computers, data sources, storage devices, and the like, on a computer network such as the Internet. The network interface 206 may be configured to communicate via wired or wireless connections. As one skilled in the art should appreciate, the computing device 200 may receive an audio, image, video, and other inputs and transmit the input data to another computer, a storage device, or other source via the computer network, as well as save the input data to a networked location.

The input and/or output devices 208 enable the computing device 200 to obtain data input from a variety of devices including, but not limited to, a digital pen, a touch screen, a keyboard, a mouse, a scanner, a microphone, an inertial sensor, a video recorder, a camera and the like. In addition to the exemplary components described above, a display interface 210 may be used for outputting display information to a user. Typically, the display information is output by the display interface 210 via a display device (e.g., a screen or similar device). While not illustrated, one skilled in the art should appreciate that a display device may be incorporated as an integral element within a computing device 200 or may be separate therefrom.

The processor 202 may be configured to operate in accordance with programming instructions stored in a memory 214. The memory 214 generally comprises RAM, ROM, and/or other memory. Thus, in addition to storage in read/write memory (RAM), programming instructions may also be embodied in read-only format, such as those found in ROM or other permanent memory. The memory 214 may store an operating system 216 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 214 may also store user-executable applications 218, or programs, for conducting various functions on the computing device 200. For example, the application 218 in memory 214 may be configured according to aspects of the present disclosure to identify a user of the device and customize the operation of the device to the user.

A user detection/identification system may be implemented in an application or module implemented on the computing device 200, in a plurality of cooperating applications/modules on the computing device 200, or in a plurality of cooperating applications and/or modules distributed over multiple computing devices 200 in a computer network, for example. Components of the user detection/identification system may be identified with regard to various logical components. The device 200 may also include a user detection/identification module 220 including processing module(s) 222 and user profile storage 224. The user detection/identification module 220 may include its own processor and/or memory or may make use of processor 202 and/or memory 214. The user profile storage may be separate from storage 212 or may overlap with/be included in storage 212.

Figure 3:
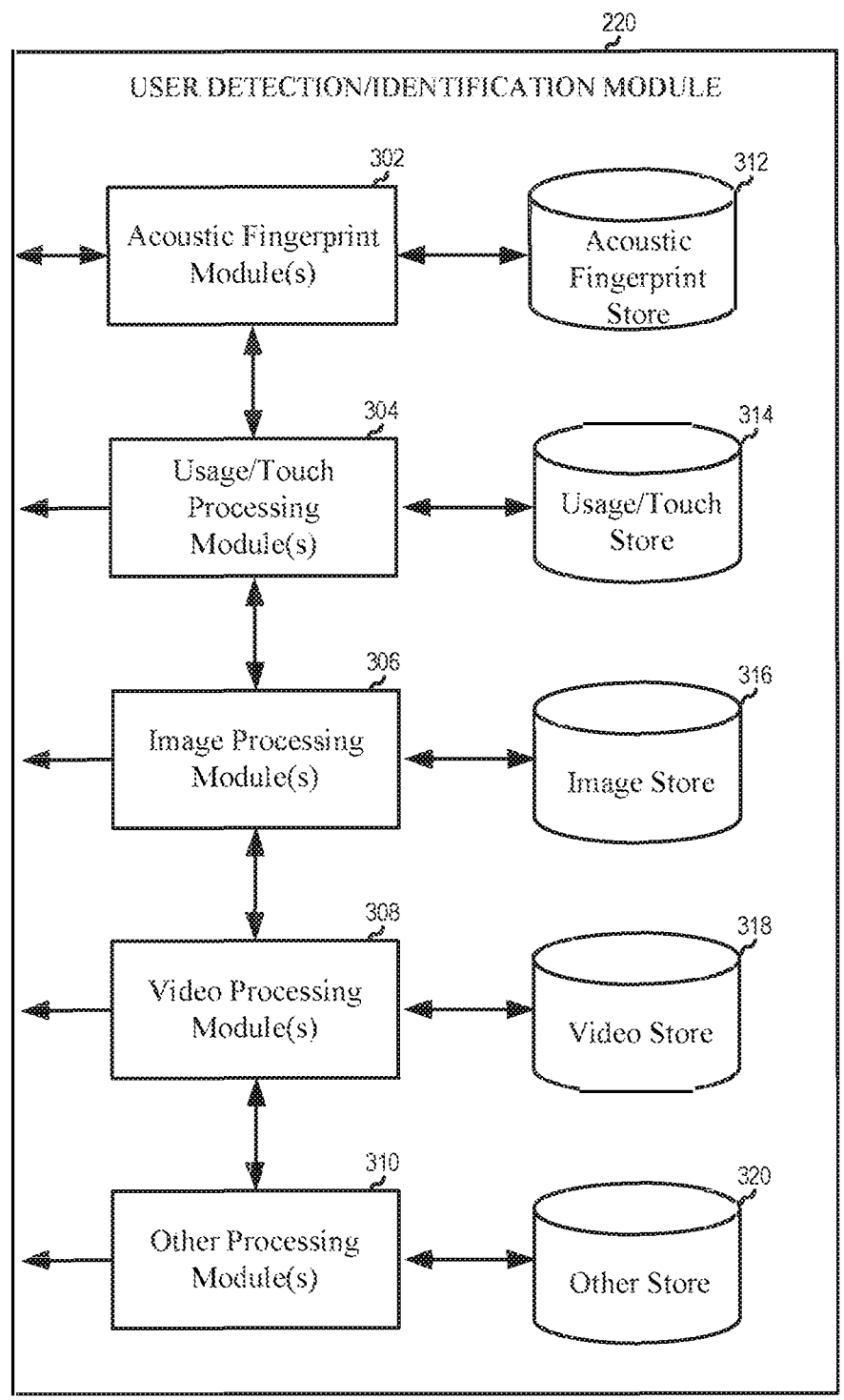
FIG. 3 is a block diagram conceptually illustrating a user detection/identification system according to one aspect of the present disclosure.

FIG. 3 is a block diagram illustrating logical components of a user detection/identification module 220 for detecting/ identifying a user of a device. As illustrated in FIG. 3, the user detection/identification module 220 includes one or more processing module(s) 222 which may include acoustic fingerprint modules 302, one or more usage/tough processing modules 304, one or more image processing modules 306, one or more video processing modules 308 and one or more other processing modules 310. Each module may include its own processor and/or memory or may make use of processor 202 and/or memory 214. Each module 302, 304, 306 and 308 may be connected to an associated storage component. For example, the acoustic fingerprint module(s) may be connected to acoustic fingerprint store 312 which stores data identifying users by their acoustic fingerprints. Usage/tough processing module(s) 304 may be connected to usage/touch store 314 which stores data identifying users by their characteristics of touching and using the device. Image processing module(s) 306 may be connected to image store 316 which stores data identifying users by their images. Video processing module(s) 308 may be connected to video store 318 which may store video associated with particular users and/or may store video associated with particular audio segments (such as matching a speaker's words to the movement of his/her mouth) so that input audio may be compared with video of a device user to confirm whether received audio is being spoken by a device user. Other processing module(s) 310 may be connected to other store 320 which may store additional data associated with a particular users so that other data may be compared to confirm whether received audio is being spoken by a device user.

The individual storage components 312, 314, 316, 318 and 320 may be separate components or may be grouped in some manner with user profile storage 224 and/or storage 212. In another aspect, other modules and/or storage components may also be included in the user detection/identification module 220. Such modules may include components for considering other information when identifying a user of a device. Such information may include location information, device usage information, or other kinds of information such as those described below.

The modules 302, 304, 306, 308 and 310 may perform user detection and identification, but may also perform user profiling/fingerprinting, where the data used to populate stores 212, 312, 314, 316, 318 and 320 is generated. For example, the acoustic fingerprint module(s) 302 may take an input audio information to generate an acoustic fingerprint for a user and store it in store 312. Additionally, the acoustic fingerprint module(s) 302 may take input audio information to refine an existing acoustic fingerprint for a user stored in store 312. Similar usage/touch characteristic data may be populated into usage/touch store 314 by usage/touch processing module(s) 304, image data may be populated into image store 316 by image processing module(s) 306, video data may be populated into video store 318 by video processing module(s) 308 and other data may be populated into other store 320 by other processing module(s) 310.

Figure 4:
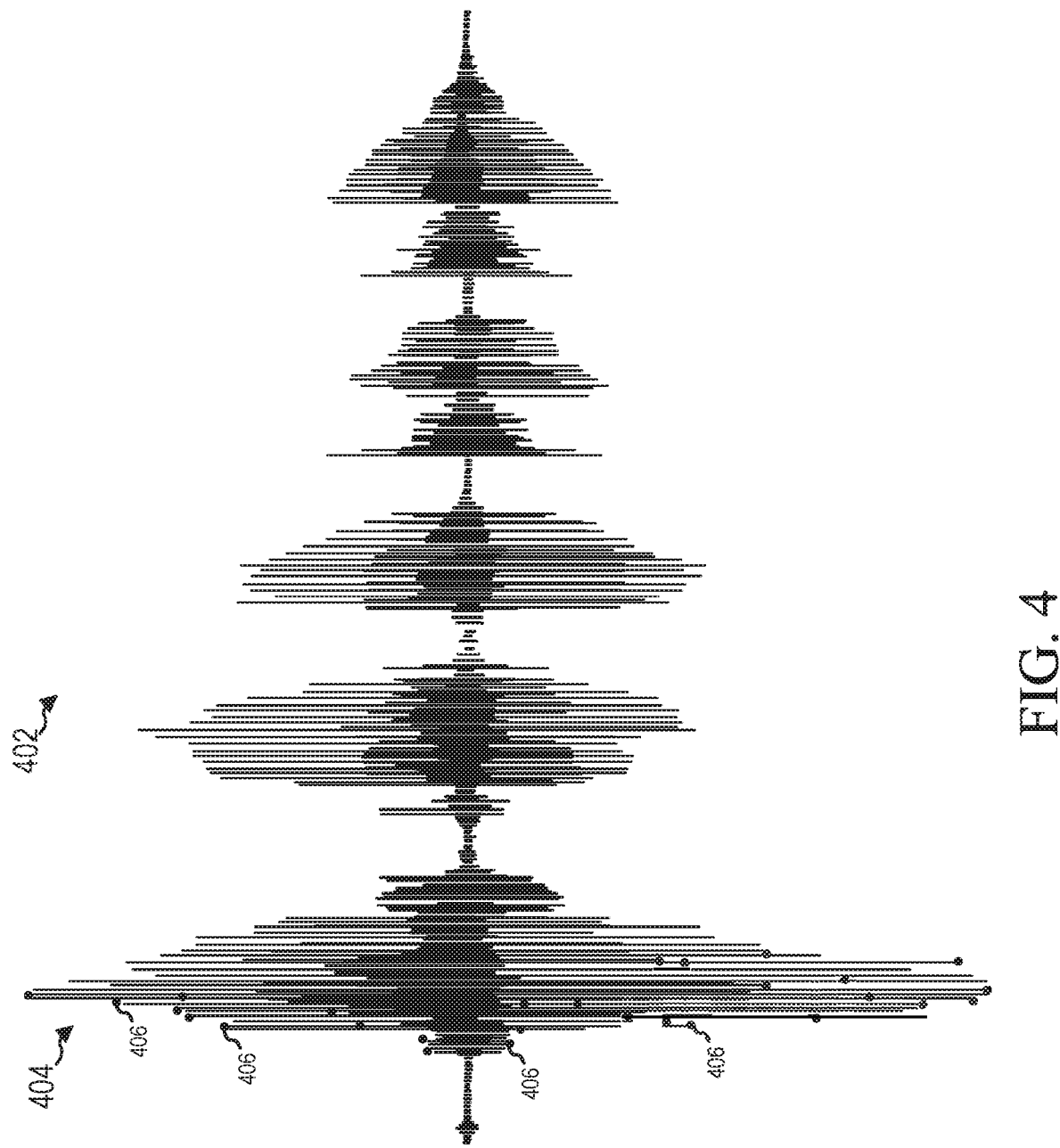
FIG. 4 illustrates an audio waveform processed according to one aspect of the present disclosure.

Once the stores are populated, the user detection/identification module may perform user identification using modules 302, 304, 306, 308 and 310. For example, the user detection/identification module 220 may receive an audio input, such as a spoken input from a user. The input may be received through a microphone of the device. The acoustic fingerprint module 302 may analyze the audio input of the spoken input and generate a signature or voice/acoustic fingerprint of the voice of the user that spoke the input. The acoustic fingerprint may be generated using any of numerous acoustic fingerprinting techniques. In one example, the audio input is analyzed and a digital summary of attributes of the audio is created, for example, using frequency, intensity and other attributes of the audio input. FIG. 4, illustrates a digitized audio waveform 402, with multiple points 406 of a first portion 404 as the audio waveform 402 is being processed. The audio qualities of those points, for example, frequency and intensity, as well as the user's typical voice interactions with a device may be used in generating the voice/acoustic fingerprint of the user. The audio qualities of the points may also be combined into a matrix that represents a time period or length of the audio. A number of approaches known to those skilled in the art may be used to process the audio data.

The usage/touch processing module 304 may process usage/touch characteristics of the current user of the device, for example, collected with an inertial sensor of the device to that can be used to measure and/or calculate and record the amount of pressure the user touches the screen with, the acceleration, the velocity and the orientation of the device. Usage/touch characteristics include characteristics which describe how a user typically interacts with the touch screen of a device or how a user physically interacts with the device. Such characteristics may include if a user typically users a right or left hand to interact with the device, how much pressure the user typically applies when interacting with the device, the speed of the user's touch strokes on the device, the thickness of the user's strokes on the device (which may correlate to both the pressure of the user's touch as well as the size of his/her fingers), the angles at which the user approaches a touch screen of the device, the grip of the user on the device, how steady the user typically holds the device, etc. Such usage/touch characteristics may be compiled to create a set of data which may assist in identifying the user or identifying certain qualities of a user (such as gender, dominant hand tendencies, etc.) The usage/touch characteristic data may be processed to identify the current user of the device. In this aspect, one or more usage/touch characteristic models for specific users may be created based on usage/touch characteristics of the user stored in that user's profile. In this aspect, the usage/touch characteristics of the current user may be compared to identified usage/touch characteristics stored in the usage/touch store 314 to identify the current user.

The image processing module 306 may process an image of the current user of the device, for example, taken with a camera of the device. The image may be processed using facial recognition, or other known techniques to identify the current user of the device. In this aspect, one or more facial recognition models for specific users may be created based on an image of the user stored in that user's profile. In this aspect, the image of the current user may be compared to identified images of users stored in the image store 316 to identify the current user.

The video processing module 308 may process video of the current user of the device, for example, taken with a video recorder of the device. In one aspect, the video may be processed to detect mouth and lip movements of the current user speaking an input into the device. These mouth and lip movements, as well as other video features, may be analyzed and compared to an audio input to determine whether the audio corresponds to the spoken input of the user. In this aspect, the video may be used to confirm that the audio input is in fact coming from the current user rather than audio coming from a different individual. In another aspect, the video may also be processed using facial recognition techniques to identify the current user of the device. Video data for this processing may be stored in video store 318.

The usage/touch processing, the video processing and/or the image processing techniques may be combined with the acoustic fingerprinting and audio/voice recognition techniques to identify the current user of the device. For example, the facial recognition techniques may provide additional assurances that the user being identified using the acoustic fingerprinting and audio/voice recognition techniques is correct.

In an aspect, the user detection/identification module 220 may receive input data and may initiate instructions to other components/applications of a device in order to perform actions, such as performing user recognition processing or performing configuring of another device based on user recognition results. For example, the acoustic fingerprinting, voice recognition, usage/touch processing, image processing and/or video processing may be performed by a local device or by a remote device. If performed by a remote device, the remote device may then send instructions to a local device to perform operations.

Figure 5:
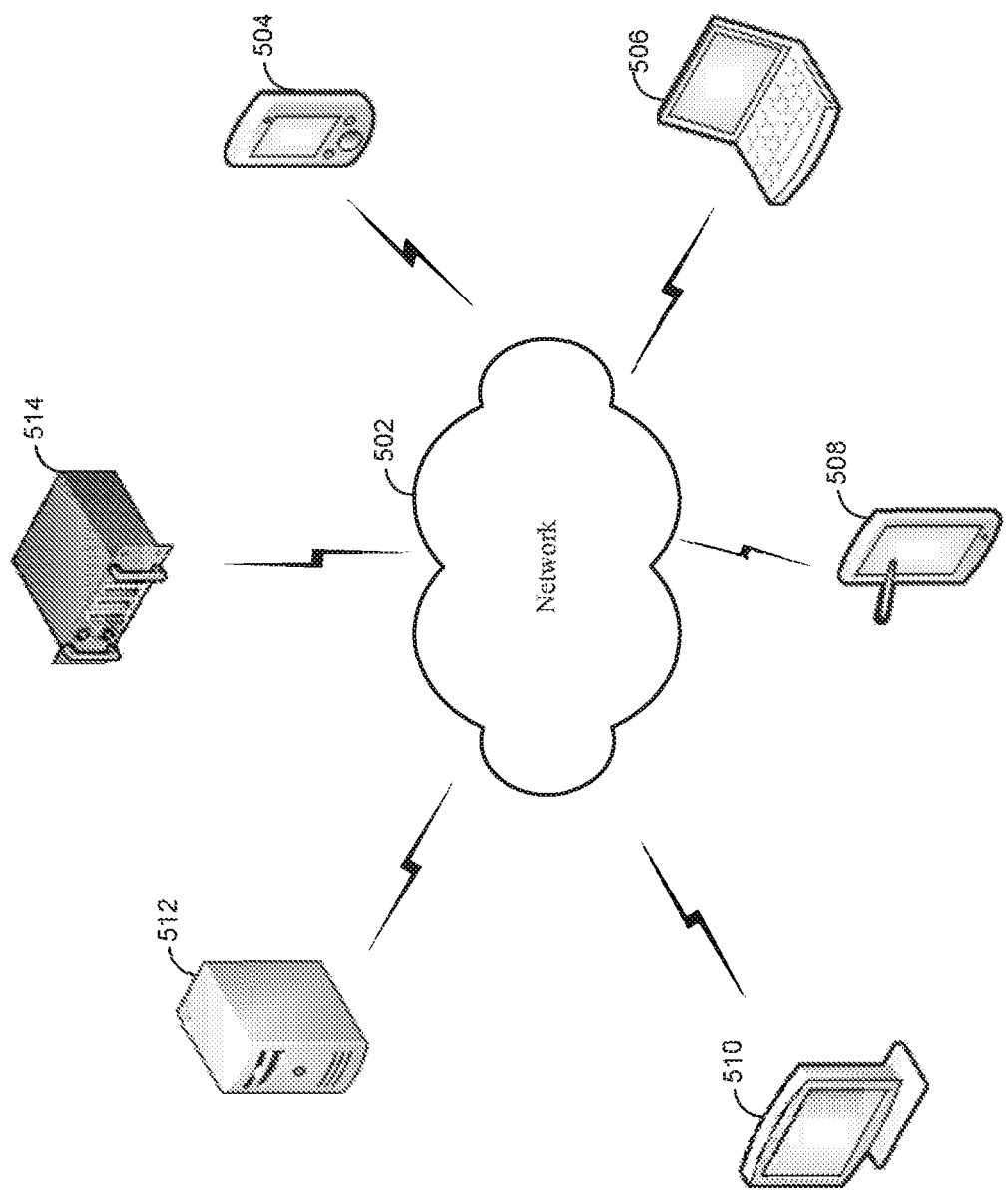
FIG. 5 illustrates a computing network for use with distributed processing according to one aspect of the present disclosure.

As shown in FIG. 5, multiple devices may be connected over a network 502. Network 502 may include a local or private network or may include a wide network such as the internet. Devices may be connected to the network 502 through either wired or wireless connections. For example, a wireless device 504 may be connected to the network 502 through a wireless service provider. Other devices, such as computer 510, may connect to the network 402 through a wired connection. Other devices, such as laptop 506 or tablet computer 508 may be capable of connection to the network 502 using various connection methods including through a wireless service provider, over a WiFi connection, or the like. Networked devices may receive spoken audio through a number of audio input devices. Audio input devices may be connected to networked devices either through a wired or wireless connection. Networked devices may also include embedded audio input devices.

In certain system configurations, one device may capture or receive an audio signal, video signal and/or image signal and other device(s) may perform the acoustic fingerprinting, voice recognition, usage/touch characteristic processing, image processing and/or video processing. For example, audio input may be received by computer 510 and sent over the network 502 to computer 512 or server 514 for processing. Or computer 510 may partially process the audio signal before sending it over the network 502. In another aspect, the acoustic fingerprinting, voice recognition, usage/touch characteristic processing, image processing and/or video processing may all be performed on different devices. Because such processing may involve significant computational resources, in terms of both storage and processing power, such split configurations may be employed where the device capturing or receiving the input data or signal has lower processing capabilities than a remote device.

Figure 6:
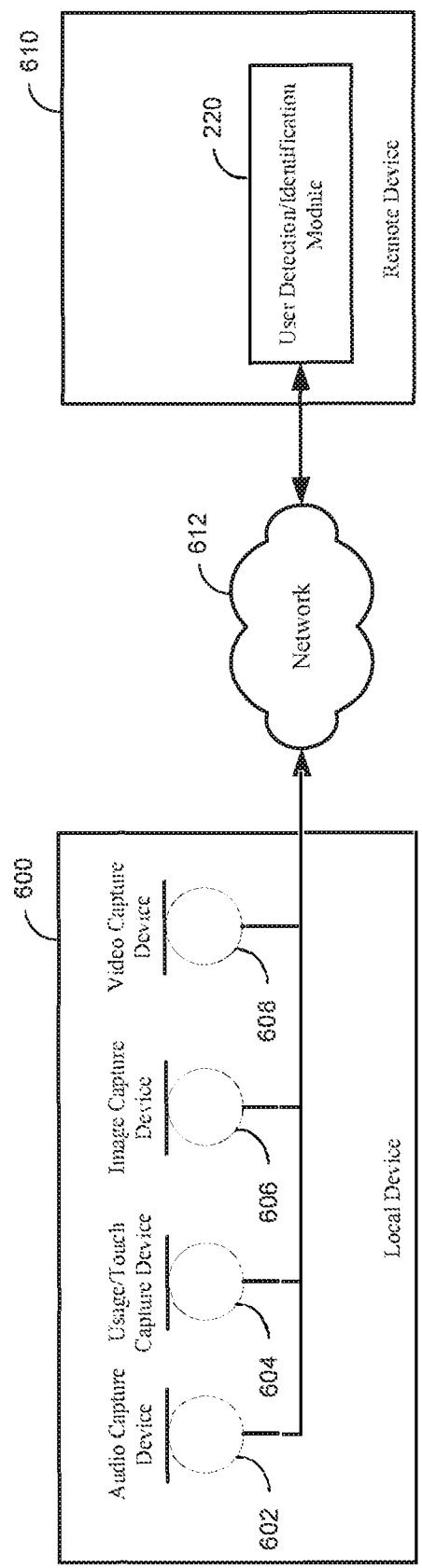
FIG. 6 is a block diagram conceptually illustrating a local device and a remote device for use in a distributed processing environment according to one aspect of the present disclosure.

One configuration of the present disclosure is shown in FIG. 6. In this configuration, a first device or local device 600 may include an audio capture device 602, a usage/touch capture device 604, an image capture device 606, a video capture device 608 The audio capture device 602, the usage/touch capture device 604, the image capture device 606 and/or the video capture device 608 may be internal to the local device 600 or may be located external to the local device 600. A second device or remote device 610 is in communication with the local device 600 over a network 612. The two devices may be examples of computing device 200, or may be other devices. The network 612 may be a wide area network such as the Internet, a local area network, a network allowing physical connection of the devices, a wireless communication network, or other suitable connection between the devices including a direct (wired or wireless) connection.

Audio, usage/touch, video, and/or image data is captured by the audio capture device 602, the usage/touch capture device 604, the image capture device 606 and/or the video capture device 608 and an audio signal, usage/touch data signal, image signal, and/or video signal is produced. The signal(s) may be processed by the local device 600 or may be transmitted over the network 612 to the remote device 610 for processing. For example, the local device 600 may capture audio and transmit the audio over the network 612 to the remote device 610. The remote device may include user detection/identification module 220 which performs user identification as described herein. In another aspect the local device may perform some processing on the captured audio, usage/touch, image and/or video data prior to sending to the remote device. For example, instead of sending raw data to the remote device 610 the local device 600 may send a limited representation of the raw data, where the representation is sufficient for the remote device 610 to perform user identification.

In another aspect, usage data may be collected and transmitted to the remote device 610 for processing. In one aspect, the remote device 610 may associate the usage data to the identified user, analyze the usage data and generate configuration instructions that correspond to a customized user interface based on the usage data. The configuration instructions may then be transmitted to and executed by the local device 600 to customize the operation of the local device 600 to the current user.

In another aspect, the remote device 610 may transmit other user profiles and including acoustic fingerprints of other users to the local device 600. In this aspect, the local device 600 can identify other users that may be using the local device 600 and customize the operation of the local device 600 to those specific other users.

Figure 7:
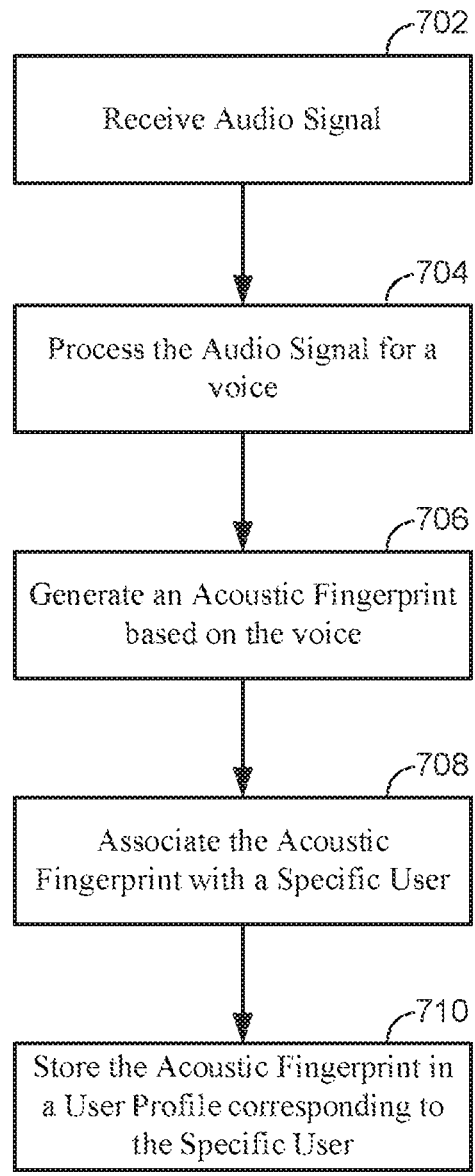
FIG. 7 illustrates a flow diagram of a method and system for identifying a user of a device according to one aspect of the present disclosure.

FIG. 7 is a flow diagram illustrating an exemplary method for generating an acoustic fingerprint for a user and storing that fingerprint in a user profile. One or more of the logical components of FIGS. 2 and/or 3 may perform the method of FIG. 7. In block 702, the device receives or captures audio, for example, via a microphone of the device. The audio is processed to identify voices within the audio, as illustrated in block 704. Upon determining there is a voice contained in the audio, an acoustic fingerprint is generated based on the voice, as illustrated in block 706. The acoustic fingerprint may be associated with the specific user, as illustrated in block 708, and the acoustic fingerprint can be stored in a user profile corresponding to the specific user speaking the audio, as illustrated in block 710. In an aspect, a device may include a setting option, that allows a user to specifically record the user's voice in a controlled environment. This may allow the device to receive a higher quality audio signal and generate a higher quality acoustic fingerprint for the specific user. The recorded voice may be used to generate an audio fingerprint to be stored in the corresponding user profile. Once user profiles are generated they may be compared to incoming audio from users to identify the user of a device.

In one aspect, once input audio is analyzed as part of a user identification process, it may be desirable to further analyze the audio and/or one or more additional inputs which may be used to confirm the user identification from the audio input. For example, a device may wish to discard portions of input audio that include speech from a source which not actually the user of a device (such as an individual standing near the device, a song or video being played by the device, etc.). In one aspect, a device may correlate audio input with a known audio being output by or near a device (such as a music app playing while a device is receiving speaking input). If there is a strong correlation between the audio input and the known audio being output, the audio input may be discarded.

Figure 8:
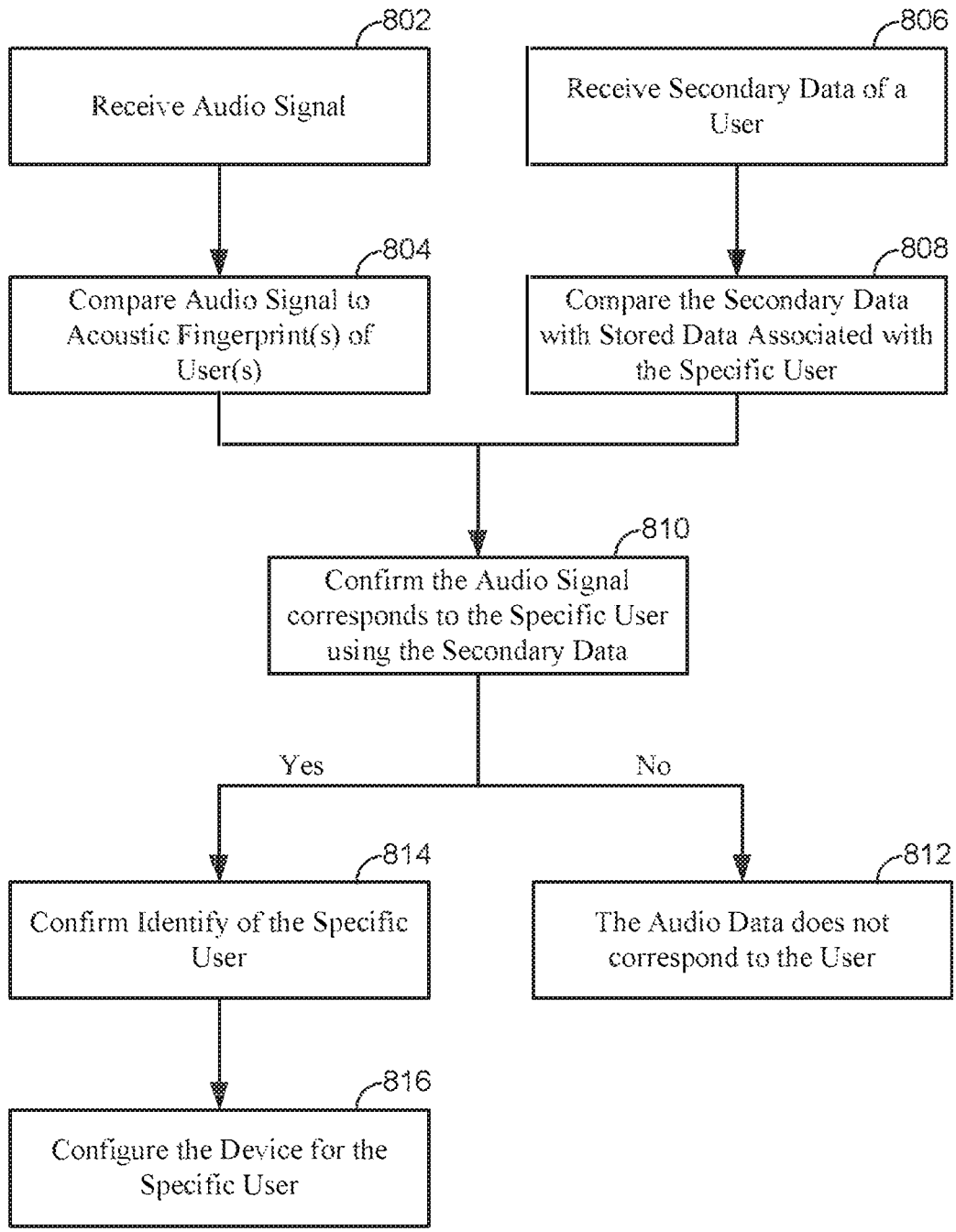
FIG. 8 illustrates a flow diagram of a method and system for confirming an identity of a user of a device according to one aspect of the present disclosure.

In another aspect, secondary data, for example, image data, video data, user usage/touch data, user usage history data, location data, and other data can be collected and compared to stored data in a user profile. For example, an image of the current user of a device may be taken by a camera of the device and compared to stored images of users. FIG. 8 is a flow diagram illustrating an exemplary method for confirming a user of the device using secondary data of the user. In block 802, the device receives or captures audio, for example, via a microphone of the device. The received audio signal may then be compared to available acoustic fingerprint(s) of user(s) to preliminarily identify a user, illustrated as block 804. The device may also take or receive secondary data (e.g., image data, for example, via a camera of the device) corresponding to the user (e.g., an image of the user), illustrated as block 806. The secondary data may be compared to stored data of the user (e.g., a stored image of the user), illustrated as block 808. The secondary data may be used to confirm that the audio is coming from the same user (e.g., as shown in the image), illustrated as block 810. For example, if the secondary data does not match the stored data of the user, the audio probably may not correspond to the user, illustrated as block 812. When the secondary data matches the stored data of the user, the audio probably likely corresponds to the user. When the audio does correspond to the user, the identity of the specific user may be confirmed, illustrated as block 814, and the device may be configured for the specific user, illustrated as 816.

Figure 9:
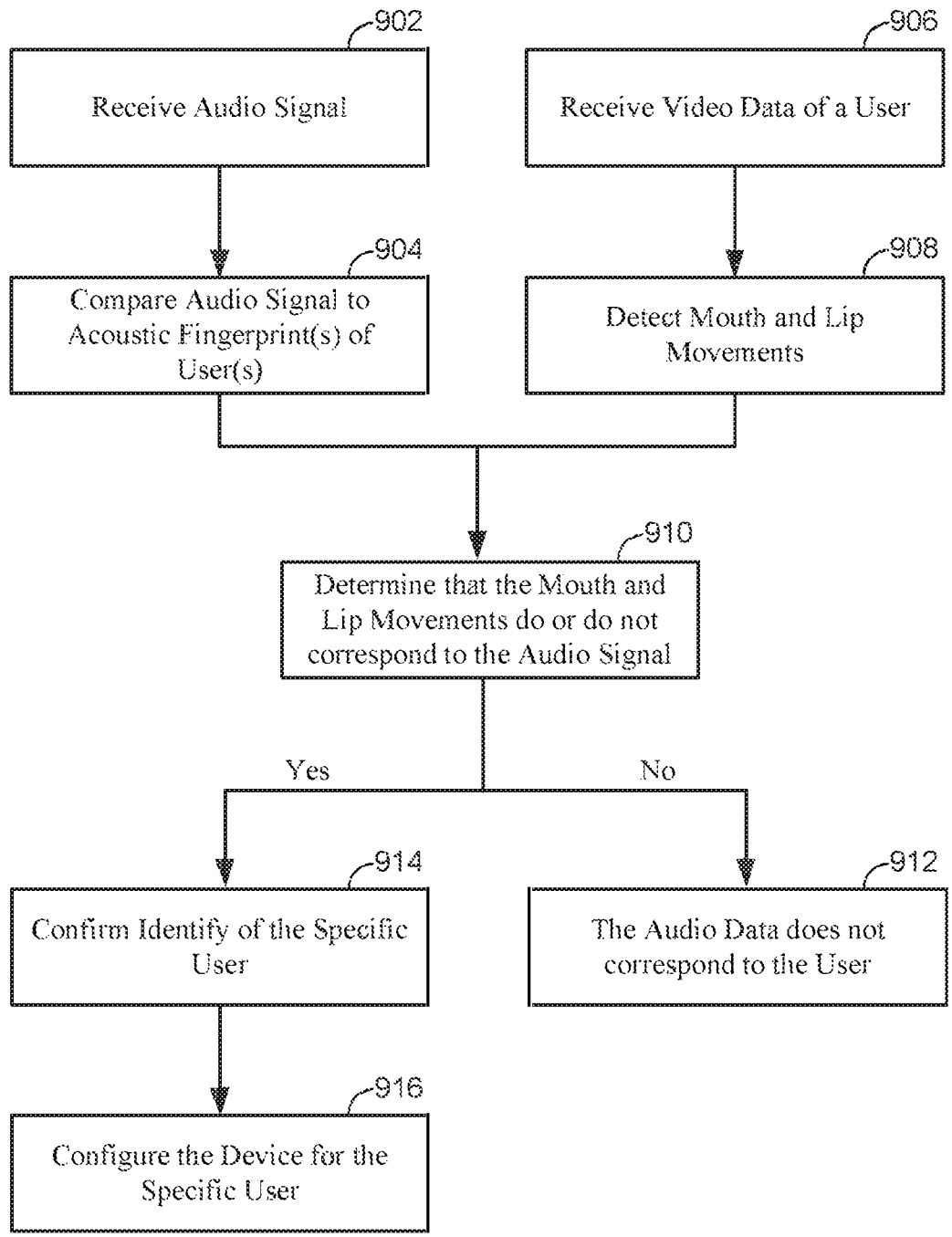
FIG. 9 illustrates a flow diagram of a method and system for confirming an identity of a user of a device according to one aspect of the present disclosure.

In another aspect, a video of the current user may be taken by a video recorder of the device. FIG. 9 is a flow diagram illustrating an exemplary method for confirming a user of the device using a video recording. In block 902, the device receives or captures audio, for example, via a microphone of the device. The received audio signal may then be compared to available acoustic fingerprint(s) of user(s) to preliminarily identify a user, illustrated as block 904. The device can also take or receive video data, for example, via a video recorder of the device, corresponding to a video of the user, illustrated as block 906. The video data can be analyzed to detect mouth and lip movements of the user while speaking an input contained in the audio, illustrated as block 908. The video data can be used to compare the audio to the mouth and lip movements to confirm that the audio corresponds to the spoken input of the user, illustrated as block 910. For example, if the video data does not correspond to the spoken input of the user, the audio probably does not correspond to the user, illustrated as block 912. When the video data corresponds to the spoken input of the user, the audio probably does correspond to the user. When the audio does correspond to the user, the identity of the specific user may be confirmed, illustrated as block 914, and the device may be configured for the specific user, illustrated as 916.

In an aspect, the local device may include additional input devices, for example, touch sensors and inertial sensors that may be used to record user specific data (e.g. user usage/touch characteristics) such as the amount of pressure the user touches the screen with, acceleration, velocity and/or the orientation of a device when used by a particular user. The device may also include a location component which determines the location of a device while being used by a user. Other such components and information may be gathered. This data may be used to both populate a user profile and to compare input data to existing user profiles to identify a user. For example, these inputs may also be processed by the device or be transmitted to a remote device for processing of the morphology of the user. This morphology may relate to touch characteristics of the user, for example, the strength or pressure of the touch, the length of touch (in terms of both time of contact with a touch screen and length of typical strokes on the touch screen), the smoothness of the touch (such as how a user's touch on the device varies or stays consistent during a particular touch stroke), the preference for the left or right hand, or the like. This morphology may be a combination of aspects of the user, such as, the size, weight, strength, and gender of the user, and can be factored into the customization of the device. For example, vibration of the device may be observed by the inertial sensor when the user touches and taps on the device. A sharp vibration or acceleration of the device may correspond to a women, for example, and a smoother longer vibration of the device may correspond to a larger male, for example. By analyzing the data collected by the touch sensors and inertial sensors, the analyzed data can be factored into the identification of the user as well as factored into the customization of the device. This may allow the device to be adapted more precisely to the morphology of the user.

Figure 10:
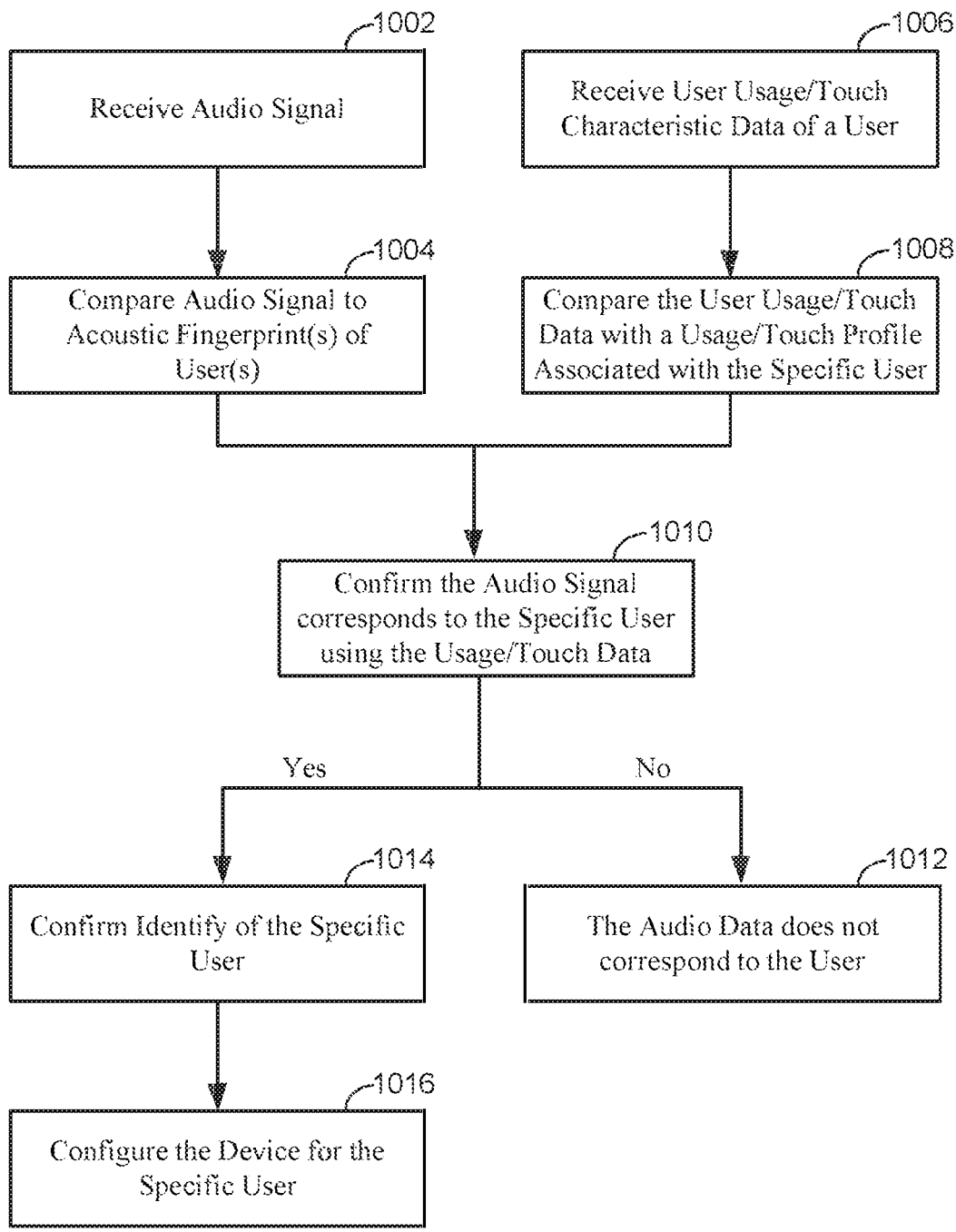
FIG. 10 illustrates a flow diagram of a method and system for confirming an identity of a user of a device according to one aspect of the present disclosure.

In an aspect, user usage/touch characteristics of the current user may be collected and recorded by a touch sensor and/or inertial sensor of the device. FIG. 10 is a flow diagram illustrating an exemplary method for confirming a user of the device using user usage/touch characteristics. In block 1002, the device receives or captures audio, for example, via a microphone of the device. The received audio signal may then be compared to available acoustic fingerprint(s) of user(s) to preliminarily identify a user, illustrated as block 1004. The device can also take or receive user usage/touch characteristic data, for example, via a touch sensor and/or inertial sensor of the device, illustrated as block 1006. This user usage/touch characteristic data may correspond to an amount of pressure the user touches the screen with, the length and the smoothness of the touch, acceleration, grip, velocity and/or the orientation of the device when touched by the user, and other data corresponding to the usage/touch characteristics of the user.

The user usage/touch characteristic data can be analyzed and compared to a stored user usage/touch profile associated with the specific user, illustrated as block 1008. The user usage/touch characteristic data can be used to confirm that the audio corresponds to the specific user, illustrated as block 1010. For example, if the user usage/touch characteristic data does not correspond to the user, the audio probably does not correspond to the user, illustrated as block 1012. When the user usage/touch characteristic data corresponds to the user, the audio probably does correspond to the user. When the audio does correspond to the user, the identity of the specific user may be confirmed, illustrated as block 1014, and the device may be configured for the specific user, illustrated as 1016.

In an aspect, both positive and negative confirmations/associations (e.g., when the audio corresponds or does not correspond to the specific user) of the user may be used as feedback inputs to increase the accuracy of the acoustic fingerprint and the user profile. Thus, the acoustic fingerprint and user profile can be continuously updated and tailored to the specific user, which may then feed into the identification of the user making the identification more accurate and efficient.

As illustrated above, following identification of a user of a device, the device may then be customized for use by the specific user. For example, a user's personalized information (such as identity, phone number, etc.) may be associated with the device while the device is being used by the user. Further, applications that are frequently used by the user may be activated for the device. Other information such as contacts, calendar entries, graphical user interface preferences, operational preferences, wireless carrier information, etc. may be activated/made available to the device. In one aspect this data may be sent to the user operated device from a remote device. In another aspect this data may be resident on the local device operated by the user, but only activated once the user is recognized using the techniques described herein. In another aspect some data may be sent to the device and other data may be resident on the device and activated upon user identification. User configuration data may be stored as part of user profile storage 224, in storage 212 or as part of one or more other storage component(s).

Figure 11:
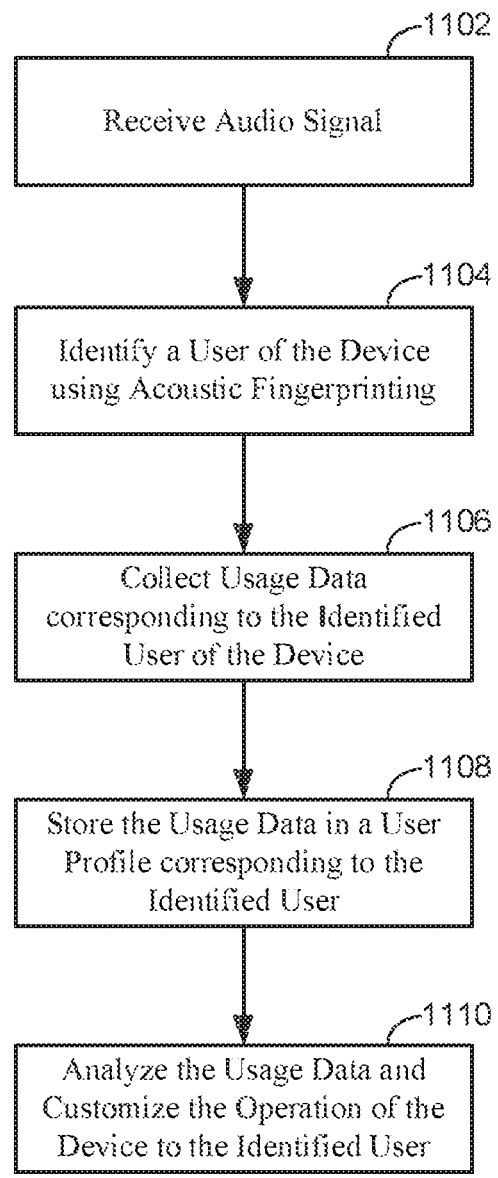
FIG. 11 illustrates a flow diagram of a method and system for customizing operation of a device of an identified user according to one aspect of the present disclosure.

When a particular user has been associated with a device, the operation of the device by the user may be used to populate a user profile associated with the user that may then be used for further customization of the device based on the preferred operation of the device by the user. FIG. 11 is a flow diagram illustrating an exemplary method for identifying a user and then customizing the device to the current user based on the user's usage data. In block 1102, the device receives or captures audio, such as, a voice command, via a microphone of the device. The user of the device is then identified using acoustic fingerprinting, illustrated as block 1104. The acoustic fingerprinting may include comparing the voice input to one or more acoustic fingerprints of one or more users of the device, which may be stored in a user profile corresponding to the individual users. The identity of the current user is then identified by determining which acoustic fingerprint matches the voice input. Further, any of the methods described above for confirming that the voice command is from the user can be used, including taking an image of the current user with a camera of the device and recording a video of the current user issuing the voice command, etc.

Usage data corresponding to the use of the device may be collected and associated with the current user, illustrated as block 1106. The usage data may also be stored in the user profile corresponding to the current user, illustrated as block 1108. This usage data may be analyzed to customize the operation of the device to the current user, illustrated as block 1110. For example, the usage data may indicate which applications the user frequently utilizes (e.g. email, video, internet searching, etc.), how often the user uses the device, and what the user uses the device for. Based on this information the behavior and operation of the device may be customized to the specific preferences and uses of the current user. The usage data may be collected prior to identifying the user and associated with the user upon identification of the user and/or collected after identifying the user and associated with the user.

In an aspect, the user profile may include other information about the user that may be aggregated with the usage data to further refine the behavior and operation of the device. For example, the user profile may include such information as, gender, age, height, weight, dominant hand (e.g. left handed, right handed, ambidextrous), personal interests, hobbies, and other information about the user. Any part of or all of the information about the user can be factored into the customization of the device to enhance the user experience.

Figure 12:
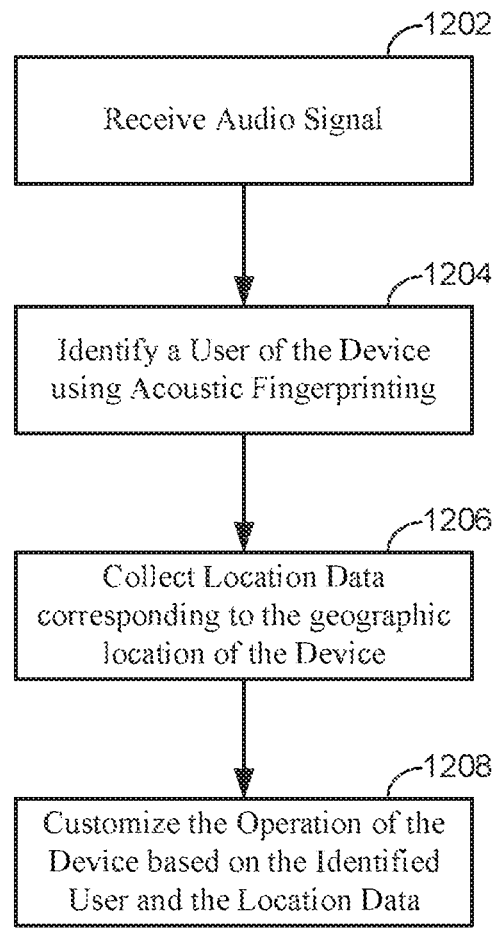
FIG. 12 illustrates a flow diagram for identifying voices and associating location data to the identified voices according to one aspect of the present disclosure.

In an aspect, location data may be collected and incorporated into the customization of the device. FIG. 12 is a flow diagram illustrating an exemplary method for customizing the device to a current user using location data. In block 1202, the device receives or captures audio, such as, a voice command, via a microphone of the device. The user of the device is then identified using acoustic fingerprinting, illustrated as block 1204. Location data corresponding to a geographic location of the device may be collected, for example, using a Global Positioning System (GPS), illustrated as block 1206. This location data may be used to customize the operation of the device to the current user, illustrated as block 1208. For example, the location data may be used to present dining options, traffic information, and other information to the user based on the user's location. The location data may also be used to identify the types of stores and places the user frequently visits, which can be used to infer the likes and dislikes of the user. Like the usage data, the location data may be collected prior to identifying the user and associated with the user upon identification of the user and/or collected after identifying the user and associated with the user.

Figure 13:
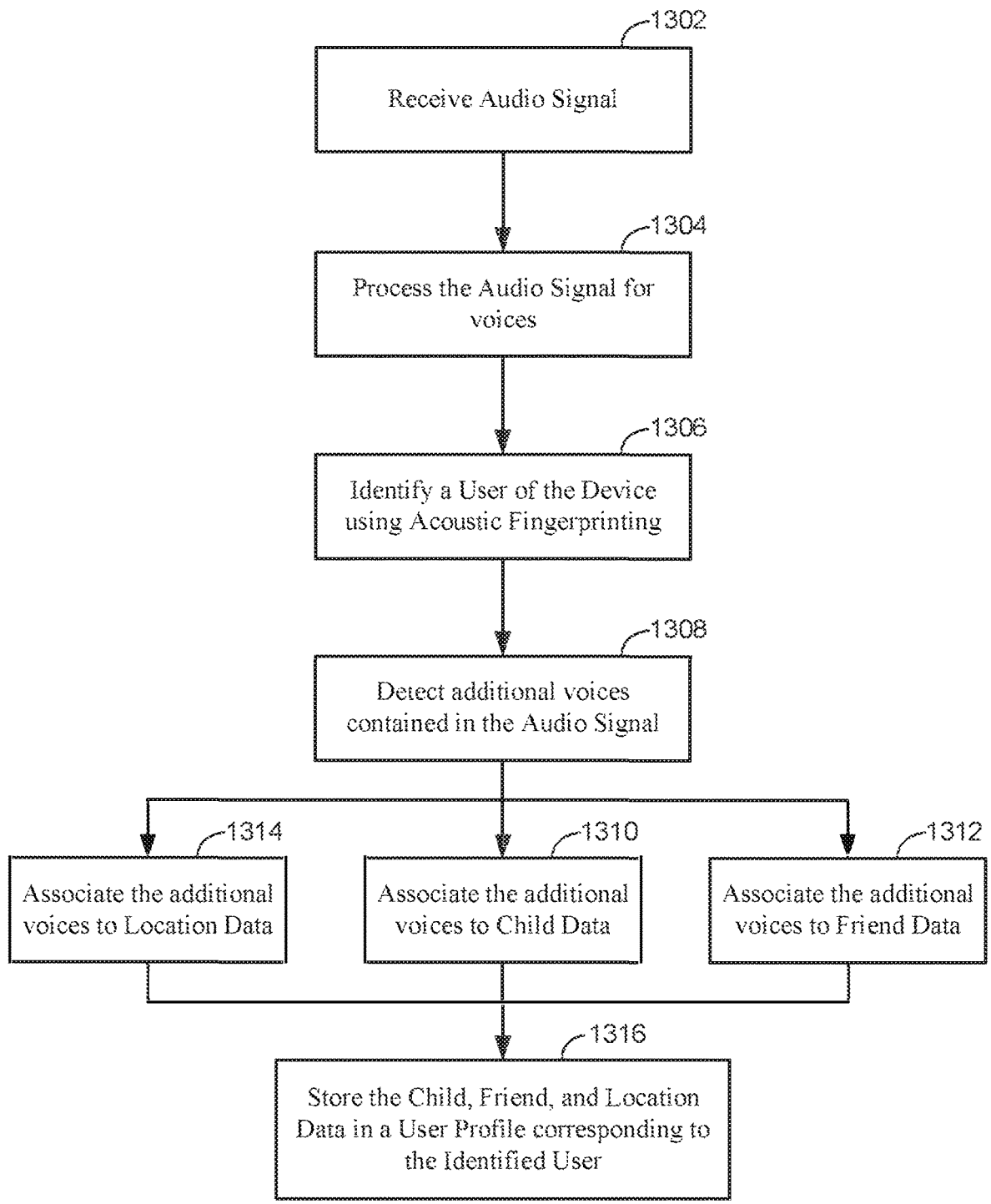
FIG. 13 illustrates a flow diagram for customizing operation of a device of an identified user using background noise according to one aspect of the present disclosure.

In an aspect, audio input into a device may include multiple voices. In this aspect, voices contained in the background may be recognized and used to customize the device to the user based on the environment the user is in. FIG. 13 is a flow diagram illustrating an exemplary method for recognizing background or additional voices. In block 1302, the device receives or captures audio via a microphone of the device. The audio is processed for voices, illustrated as block 1304. A current user of the device is identified based on at least one of the voices in the audio matching the voice of the user to an acoustic fingerprint, illustrated as block 1306. Additional voices in the audio are detected, illustrated as 1308. The additional voices may be associated to voices of children, for example, the children of the user, illustrated as block 1310. The additional voices may be associated to voices of friends or colleagues of the user, illustrated as block 1312. The additional voices may be associated to a location of the user, illustrated as block 1314. For example, the location of the user may be determined based on the voices detected. If the voices are voices of the user's children, the user is likely not at work, and may be at home. Similarly, if the voices are voices of the user's work colleagues, the user is likely at work, etc. The data associated with the child voices, friend and colleague voices, and location data may be stored in a user profile corresponding to the current user, illustrated as block 1316.

In an aspect, the additional or background voices that are detected may be correlated to certain individuals based on acoustic fingerprints that have been generated for those individuals. This can be used by the device to identify not only the current user, but also identify the people around the user. In another aspect, the detection of additional or background voices may be used in the identification of the current user. For example, based on the voices in the background, the current user of the device may be inferred. Alternatively, the background voices can be used to infer who the current user is not. Thus, even without using the acoustic fingerprinting, the current user can be identified.

In an aspect, the detection of additional or background voices may be used in the customization of the behavior and operation of the device. For example, if the current user is watching a movie not suitable for children (e.g., a R-rated movie) and the device collects background voices of children, the device may be customized to automatically stop playing the movie. Similarly, if the current user is looking up a movie to watch, and the device collects background voices of children, the device may be customized to automatically remove movies that are rated R from the available movie listing.

In an aspect, the detection of additional or background voices may be used in the customization of the behavior and operation of the device. For example, the device may access and/or receive acoustic fingerprints and user profiles of others. This allows the device to identify other users. In this aspect, a device of a first user may identify a second user and may be customized to the second user when the second user is using the device. This allows the device to be customized to friends, family members, etc. of the user when they happened to be using the device.

In an aspect, the device may be configured to detect other devices that are near the current user. In this aspect, the device may be able to identify common areas of interest between the users of the devices and make suggestions for videos, music, games, events, and other entertainment that are common or would be of interest to the various users of the devices.

In an aspect, a single device may include multiple users, for example, a first user, a second user, etc., and thus multiple user profiles may be associated with the device. Each user profile may include an acoustic fingerprint corresponding to the specific user. This allows the device to distinguish and identify who the current user is and present customized behavior and operation tailored to the specific current user. The current user may then switch among a first user and other users, and the customization of the device may also switch accordingly. In another aspect, the device may detect multiple current users of the device at same time. In this aspect, the device may be customized based on an aggregation of the multiple users' profiles to enhance the experience of the users' as a whole. For example, the device may suggest videos, songs, and games to play that are of common interest to the multiple users.

In an aspect, user identification may assist with security features of a device. For example, if User A is the only authorized user of the device, when a User B attempts to use the device, the device will be able to detect that the User A is not the current user of the device. When the device detects that User A is not issuing the audio input, the device may disallow the input, lock the device, and or otherwise prevent the User B from utilizing the device.

In another aspect, the identification of the user may be useful in determining which choice commands to execute. For example, if the current user is in a crowded place with other people that are using other devices, the device may be receiving numerous audio commands that are being over heard from other users. In this aspect, the voice command from the current user can be identified and executed without the device accidentally executing an incorrect command being spoken by from someone near the current user.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first audio data corresponding to a microphone of a first device, the first audio data representing a voice of a user;
   determining a user profile corresponding to the first audio data by determining that the first audio data corresponds to voice fingerprint data associated with the user profile;
   determining usage data representing a manner in which the user has previously interacted with the first device;
   in response to the user profile corresponding to the first audio data, storing the usage data in association with the user profile to establish an updated user profile;
   receiving second audio data corresponding to the first device;
   determining that the updated user profile corresponds to the second audio data by determining that the second audio data corresponds to the voice fingerprint data associated with the updated user profile;
   determining that the updated user profile is associated with the usage data;
   based at least in part on the updated user profile corresponding to the second audio data and the updated user profile being associated with the usage data, determining at least one customization parameter for the first device based at least in part on the usage data; and
   causing the first device to be operated using the at least one customization parameter.

2. The computer-implemented method of claim 1, further comprising:
   using the first audio data to determine a location of the first device,
   wherein the at least one customization parameter is determined based at least in part on the location.

3. The computer-implemented method of claim 1, further comprising:
   determining personalized information associated with an identity of the user;
   associating the personalized information with the first device;
   after associating the personalized information with the first device, determining the user is no longer operating the first device; and
   after determining the user is no longer operating the first device, disassociating the personalized information with the first device.

4. The computer-implemented method of claim 1, further comprising:
   receiving operational data representing operation of the first device using the at least one customization parameter;
   determining a second customization parameter based at least in part on the operational data; and
   associating the second customization parameter with the updated user profile.

5. The computer-implemented method of claim 1, further comprising:
   sending, from a remote device to the first device, data representing the at least one customization parameter.

6. The computer-implemented method of claim 1, further comprising:
   storing, by at least one remote device, data associating the first device with an identity of the user.

7. The computer-implemented method of claim 1, further comprising:
   causing the first device to operate a user interface using the at least one customization parameter.

8. The computer-implemented method of claim 1, further comprising:
   causing the first device to operate an output process using the at least one customization parameter.

9. The computer-implemented method of claim 1, further comprising:
   causing the first device to operate a display using the at least one customization parameter.

10. The computer-implemented method of claim 1, further comprising:
    causing the first device to operate an input process using the at least one customization parameter.

11. A computing system, comprising:
    at least one processor; and
    at least one computer-readable medium encoded with instructions that, when executed by the at least one processor, cause the computing system to:
      receive first audio data corresponding to a microphone of a first device, the first audio data representing a voice of a user,
      determine a user profile corresponding to the first audio data by determining that the first audio data corresponds to voice fingerprint data associated with the user profile,
      determine usage data representing a manner in which the user has previously interacted with the first device,
      in response to the user profile corresponding to the first audio data, store the usage data in association with the user profile to establish an updated user profile,
      receive second audio data corresponding to the first device,
      determining that the updated user profile corresponds to the second audio data by determining that the second audio data corresponds to the voice fingerprint data associated with the updated user profile,
      determine that the updated user profile is associated with the usage data,
      based at least in part on the updated user profile corresponding to the second audio data and the updated user profile being associated with the usage data, determine at least one customization parameter for the first device based at least in part on the usage data, and
      cause the first device to be operated using the at least one customization parameter.

12. The computing system of claim 11, wherein the at least one computer-readable medium is further encoded with additional instructions that, when executed by the at least one processor, further cause the computing system to:
    user the first audio data to determine a location of the first device; and
    determine the at least one customization parameter based at least in part on the location.

13. The computing system of claim 11, wherein the at least one computer-readable medium is further encoded with additional instructions that, when executed by the at least one processor, further cause the computing system to:
    determine personalized information associated with an identity of the user;
    associate the personalized information with the first device;
    after association of the personalized information with the first device, determine that the user is no longer operating the first device; and
    after determination of the user is no longer operating the first device, disassociate the personalized information with the first device.

14. The computing system of claim 11, wherein the at least one computer-readable medium is further encoded with additional instructions that, when executed by the at least one processor, further cause the computing system to:
    receive operational data representing operation of the first device using the at least one customization parameter;
    determine a second customization parameter based at least in part on the operational data; and
    associate the second customization parameter with the updated user profile.

15. The computing system of claim 11, wherein the at least one computer-readable medium is further encoded with additional instructions that, when executed by the at least one processor, further cause the computing system to:
    send, from a remote device to the first device, data representing the at least one customization parameter.

16. The computing system of claim 11, wherein the at least one computer-readable medium is further encoded with additional instructions that, when executed by the at least one processor, further cause the computing system to:
    store data associating the first device with an identity of the user.

17. The computing system of claim 11, wherein the at least one customization parameter corresponds to a user interface of the first device.

18. The computing system of claim 11, wherein the at least one customization parameter corresponds to an output process of the first device.

19. The computing system of claim 18, wherein the output process corresponds to a display of the first device.

20. The computing system of claim 11, wherein the at least one customization parameter corresponds to an input process of the first device.

* * * * *